United States Patent
Kao et al.

(10) Patent No.: US 7,722,264 B2
(45) Date of Patent: May 25, 2010

(54) CAMERA INTEGRATED WITH DEFORMABLE SUPPORTING STRUCTURE

(75) Inventors: Shun-Ling Kao, Taipei Hsien (TW); Kang-Shun Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 178 days.

(21) Appl. No.: 11/964,777

(22) Filed: Dec. 27, 2007

(65) Prior Publication Data

US 2009/0110389 A1    Apr. 30, 2009

(30) Foreign Application Priority Data

Oct. 26, 2007    (CN) .......................... 2007 1 0202285

(51) Int. Cl.
*G03B 17/00*    (2006.01)
(52) U.S. Cl. ........................ 396/428; 396/424; 396/419
(58) Field of Classification Search ................. 396/428, 396/419, 424, 535; 248/160; D16/214, 242, D16/244, 245
See application file for complete search history.

(56) References Cited

U.S. PATENT DOCUMENTS

| | | | | |
|---|---|---|---|---|
| 5,115,264 A | * | 5/1992 | Schappler | 396/423 |
| 5,702,175 A | * | 12/1997 | Chen | 362/191 |
| 6,751,473 B1 | * | 6/2004 | Goyal et al. | 455/556.1 |
| D498,251 S | * | 11/2004 | Invencio | D16/242 |
| 2005/0237424 A1 | * | 10/2005 | Weekamp et al. | 348/373 |
| 2006/0108485 A1 | * | 5/2006 | Enderle | 248/160 |

FOREIGN PATENT DOCUMENTS

JP    2006-47443 A    2/2006
JP    2006047443 A  *  2/2006

* cited by examiner

*Primary Examiner*—W. B. Perkey
*Assistant Examiner*—Noam Reisner
(74) *Attorney, Agent, or Firm*—Jeffrey T. Knapp

(57) ABSTRACT

A camera includes a body having a front plate and a rear plate, a lens module mounted on the front plate, a slot defined in the rear plate, and an elongated deformable wire. The deformable wire is received in the slot, and the deformable wire is deformable between a first configuration where the deformable wire is received in the slot, and a second configuration where the deformable wire is released from the slot and reshaped to support the body on an object.

4 Claims, 5 Drawing Sheets

CAMERA INTEGRATED WITH DEFORMABLE SUPPORTING STRUCTURE

BACKGROUND

1. Field of the Invention

The present invention relates to a camera integrated with a deformable supporting structure.

2. Description of Related Art

Most typical camera supporting structures are of the large detachable type resulting in poor portability. It is burdensome to have to attach and detach everytime you want to use the camera with the supporting structure. Moreover it is inconvenient for a person to carry both the camera and the supporting structure.

What is needed, therefore, is to provided a camera which is integrated with a deformable supporting structure.

SUMMARY

The present invention relates to a camera. The camera includes a body having a front plate and a rear plate, a lens module mounted on the front plate, a slot defined in the rear plate, and an elongated deformable wire. The deformable wire is received in the slot, and the deformable wire is deformable between a first configuration where the deformable wire is received in the slot, and a second configuration where the deformable wire is released from the slot and reshaped to support the body on an object.

Other advantages and novel features of the present invention will become more apparent from the following detailed description of present embodiments when taken in conjunction with the accompanying drawings, in which:

DETAILED DESCRIPTION OF THE EMBODIMENT

Reference will now be made to the figures to describe the at least one present embodiment in detail.

Figure 1:
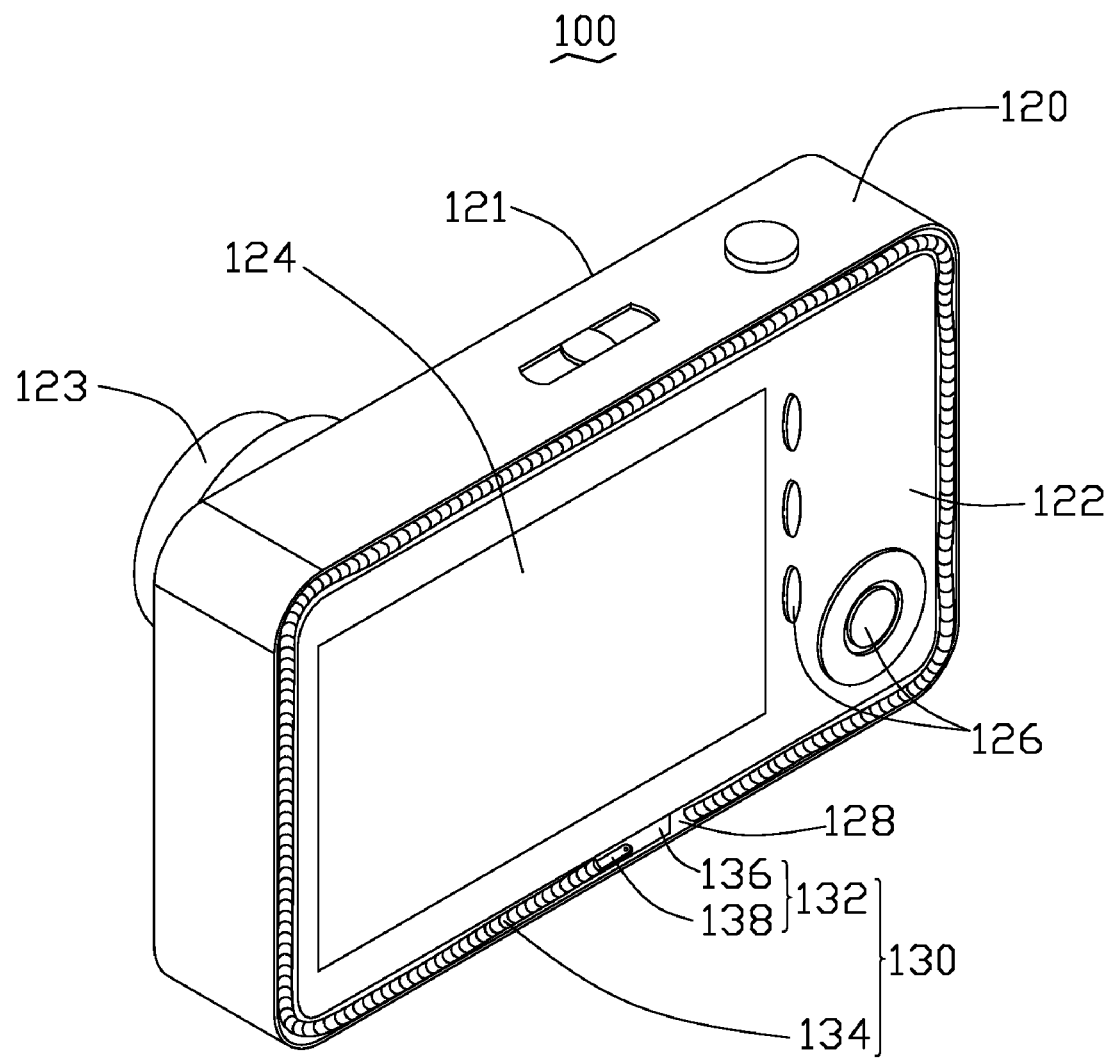
FIG. 1 is an isometric view of a camera according to a present embodiment, showing a first state of the camera.

Referring to FIG. 1, a camera 100, according to a present embodiment, is shown. The camera 100 includes a body 120, and a deformable supporting structure 130.

The body 120 includes a front plate 121 and a rear plate 122, a lens module 123, a display screen 124, and a plurality of keys 126. The lens module 123 is mounted on the front plate 121. The display screen 124 and the keys 126 are positioned on the rear plate 122. A slot 128 is defined in the rear plate 122. In this present embodiment, the slot 128 is defined at a periphery of the rear plate 122.

Figure 2:
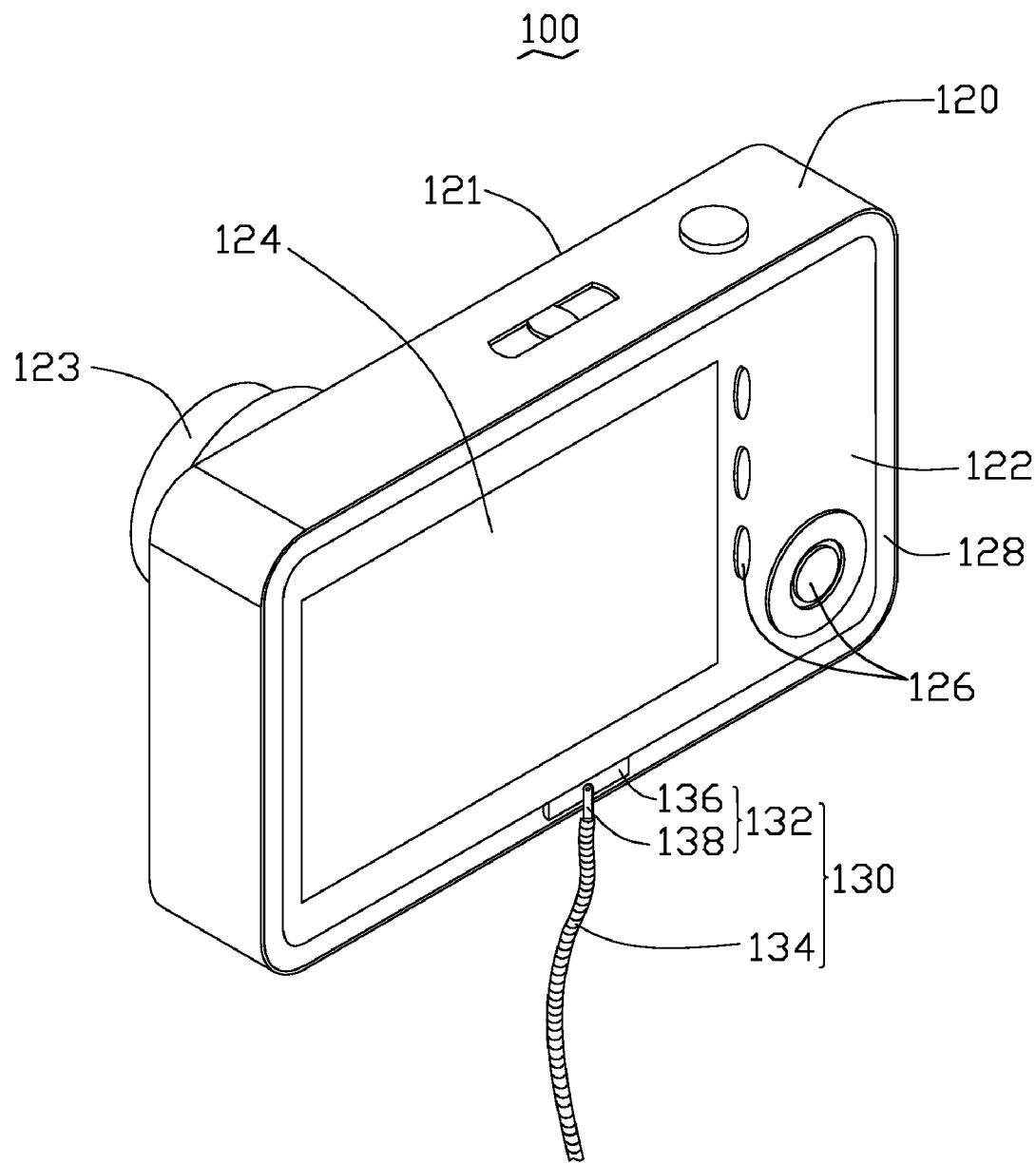
FIG. 2 is similar to FIG. 1, but showing a second state of the camera.

The deformable supporting structure 130 includes a connector 132 and a deformable wire 134. The connector 132 is a hinge structure, and includes a fixed part 136 and a rotatable part 138. The fixed part 136 is firmly secured in the slot 128. A terminal of the rotatable part 138 is rotatably connected to the fixed part 136, and another terminal of the rotatable part 138 is firmly connected to the deformable wire 134. The deformable wire 134 is deformable between a first configuration where the deformable wire 134 is received in the slot 128, as shown in FIG. 1, and a second configuration where the deformable wire 134 is released from the slot 128, as shown in FIG. 2, and reshaped to support the body 120 on an object 200, 300, as shown in FIGS. 4 and 5.

Figure 3:
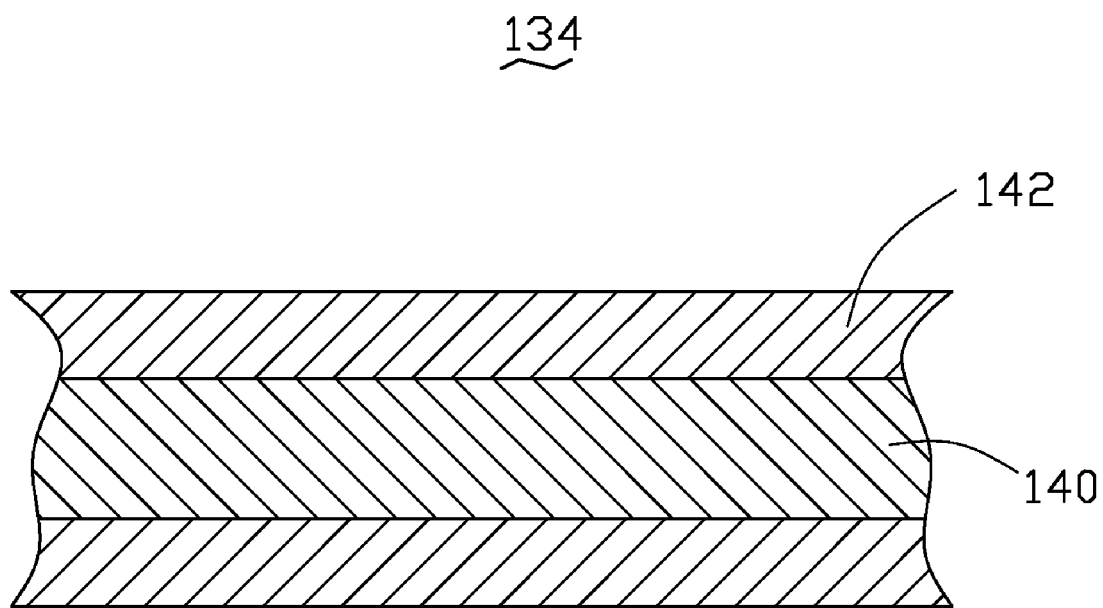
FIG. 3 is an enlarged, cross-sectional view of a deformable wire of the camera of FIG. 1.

Referring to FIG. 3, the deformable wire 134 includes a core 140 and a soft plastic shell 142 surrounding the core 140. The shell 142 together with the core 140 is capable of being shaped without loss of strength or stability so that the deformable wire 134 is of sufficient strength to firmly support a camera. Diameter of the deformable wire 134 is smaller than width of the slot 128, and length of the deformable wire 134 is less than or equal to that of the slot 128 so that the deformable wire 134 can be entirely received in the slot 128. Beneficially, the diameter of the deformable wire 134 gradually decreases from rotatable part 138 toward the distal end thereof. Therefore, cost and weight of the deformable wire 134 may be reduced while strength of the deformable wire 134 may be maintained.

Figure 4:
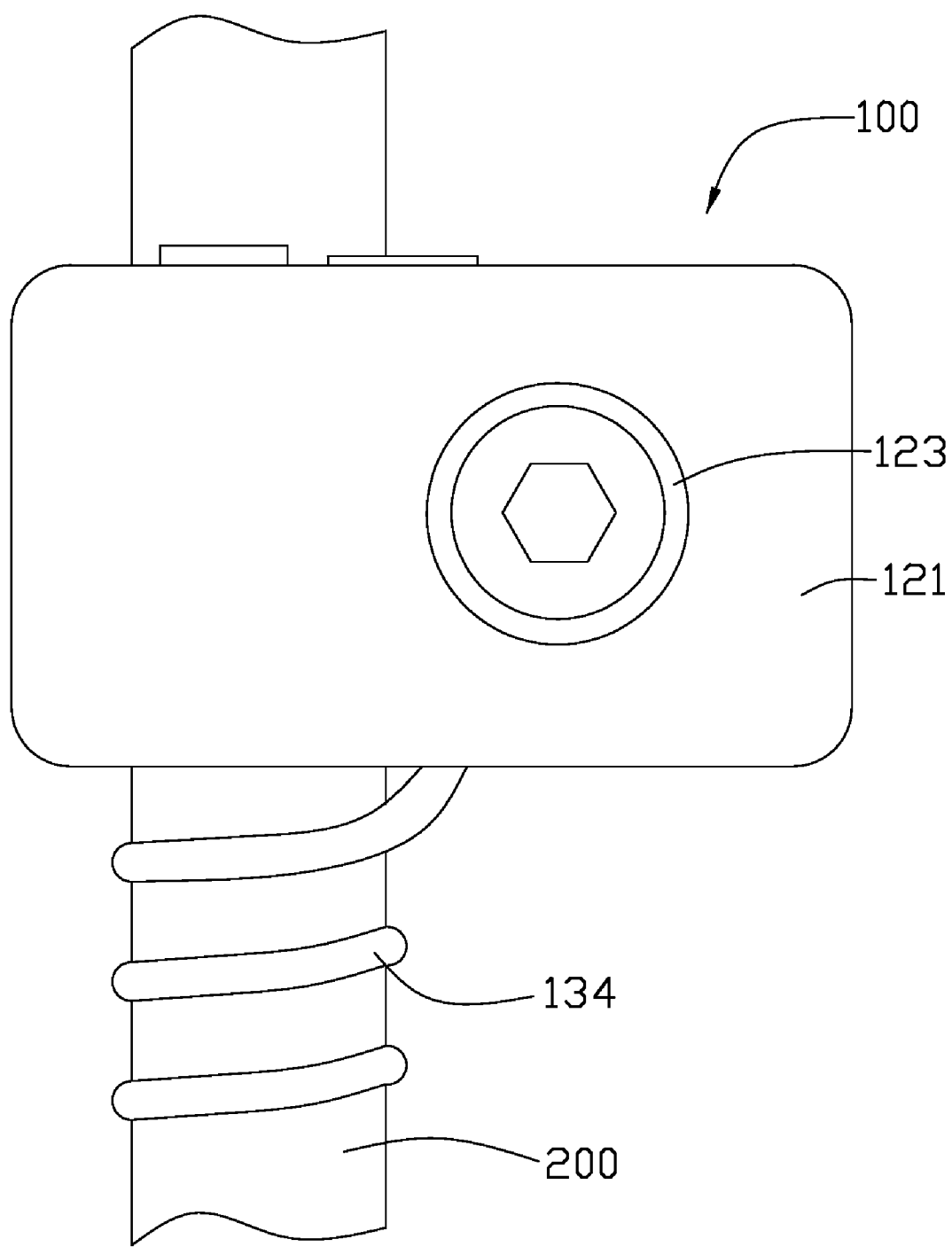
FIG. 4 shows a first usage state of the camera of FIG. 1.
Figure 5:
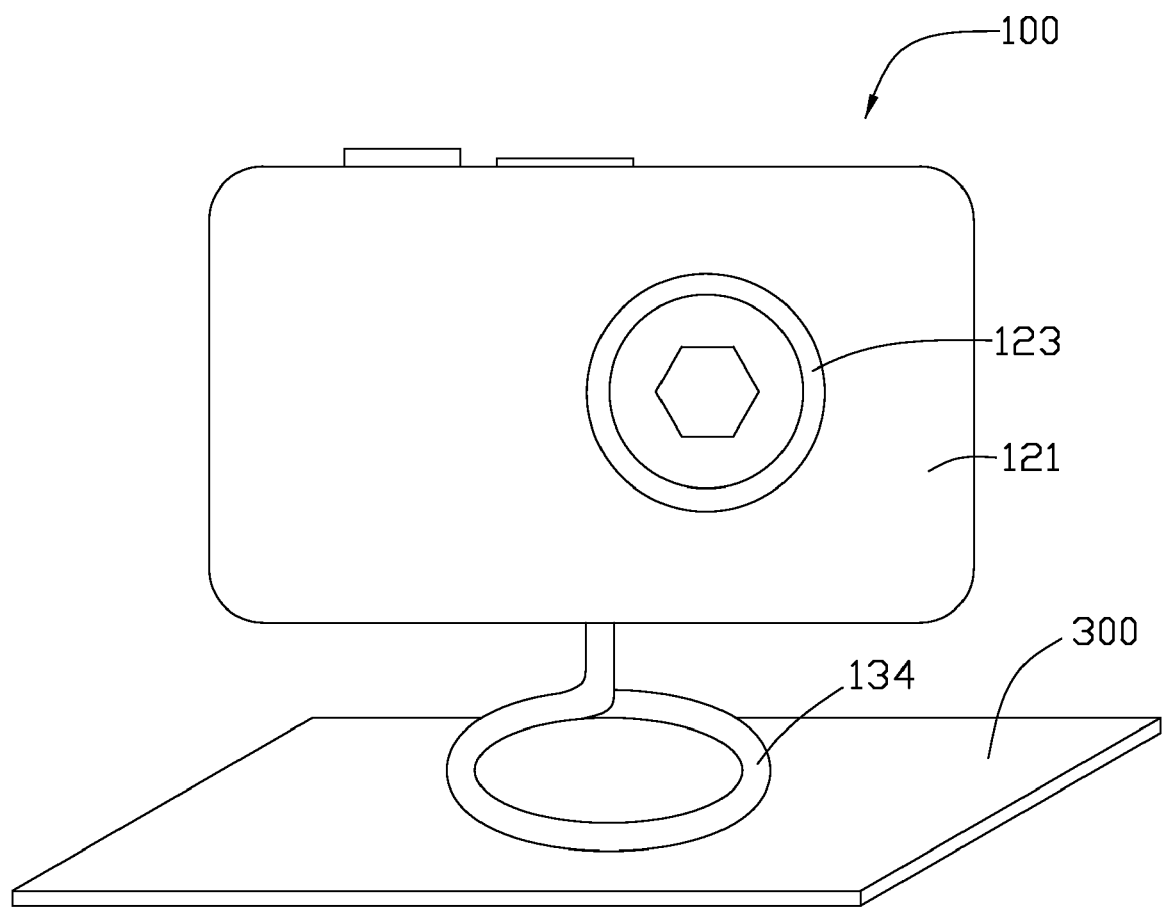
FIG. 5 shows a second usage state of the camera of FIG. 1.

Referring to FIGS. 4, and 5, usages of the camera 100 integrated with the deformable supporting structure 130 are shown. In FIG. 4, the deformable wire 134 of the deformable supporting structure 130 can be wrapped around an object 200, e.g., a pole 200 to stably support the camera 100 on the pole 200. In FIG. 5, the deformable wire 134 of the deformable supporting structure 130 can be wrapped to form a loop, and the camera 100 can be placed on a plane surface 300, e.g., a desktop 300.

When the deformable supporting structure 130 is not in use, it can be stored in the slot 128; in use, the supporting structure 130 can be attached to variety objects to firmly secure the camera 100 thereto. Therefore, portability of the camera 100 integrated with the supporting structure 130 is enhanced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera comprising: a body having a front plate and a rear plate;

a lens module mounted on the front plate;

a slot solely defined in the rear plate; and an elongated deformable wire received in the slot, the deformable wire being deformable between a first configuration where the deformable wire is received in the slot, and a second configuration where the deformable wire is released from the slot and reshaped to support the body on an object;

wherein the slot is defined at a periphery of the rear plate; and further comprising a connector wherein the connector includes a fixed part secured in the slot, and a rotatable part rotatable relative to the fixed part and connecting the deformable wire to the fixed part.

2. The camera as claimed in claim 1, wherein the deformable wire includes a core and a soft plastic shell surrounding the core.

3. The camera as claimed in claim 1, wherein a diameter of the deformable wire is smaller than a width of the slot.

4. The camera as claimed in claim 1, wherein a length of the deformable wire is less than or equal to that of the slot.

* * * * *